United States Patent [19]

Fechter

[11] 3,740,761

[45] June 19, 1973

[54] LASER RECORDING MEDIUM

[75] Inventor: Henry G. Fechter, Skokie, Ill.

[73] Assignee: Teletype Corporation, Skokie, Ill.

[22] Filed: May 28, 1971

[21] Appl. No.: 147,939

[52] U.S. Cl. ................ 346/135, 117/36.9, 346/76 L

[51] Int. Cl. ........................................... G01d 15/34

[58] Field of Search ................... 346/76 L, 76 R, 1, 346/135; 117/36.9, 36.8; 96/89; 250/65 T

[56] References Cited

UNITED STATES PATENTS

| | | | |
|---|---|---|---|
| 1,916,779 | 7/1933 | Wendt et al. | 96/89 |
| 2,054,390 | 9/1936 | Rust et al. | 96/89 |
| 3,094,417 | 7/1963 | Workman | 117/36.9 X |
| 3,452,331 | 6/1969 | Barlett | 96/89 X |
| 3,465,352 | 9/1969 | Carlson et al. | 346/76 L |

OTHER PUBLICATIONS

J. Kosar, Light-Sensitive Systems, Copyright May 1965, John Wiley & Sons, Inc., pages 387–393.

*Primary Examiner*—Joseph W. Hartary
*Attorney*—J. L. Landis and J. B. Hoofnagle, Jr.

[57] ABSTRACT

Successive areas of recording medium, having a precursor (methylene blue) reduceable with a low level of energy, are exposed to monochromatic (red) laser output for forming a record. The precursor is carried in a thin thermoplastic film from a substrate, has a color complementary to the color of the laser output, and is opaque to the wave length of energy to be used for sensing the record. A latent reducing agent included in the recording medium is carried in a thin thermoplastic film supported from the substrate. It releases a reducing agent which react with the precursor upon exposure of the medium to the laser output to reduce the precursor to a state (leuco form) which is permeable (transparent) to the wave length of the record sensing energy.

Spontaneous reduction of the precursor is prevented, according to a modified embodiment of the disclosure, by an inert barrier comprised of a thermoplastic film sandwiched in the recording medium between the films containing the precursor and the reducing agent.

5 Claims, 3 Drawing Figures

INVENTOR
HENRY G. FECHTER
BY Sherman P. Appel
ATTORNEY

LASER RECORDING MEDIUM

FIELD OF THE INVENTION

The present invention relates to recordal of intelligence in real time. Particularly, it relates to information recordal by forming a real image upon exposure of a recording medium to a low level of heat. specifically, it relates to a laser responsive carrier for records or a recording medium.

BACKGROUND OF THE INVENTION

Recordal in real time means the formation of a discernable image in recording medium directly in response to exposure thereof to writing energy. Recordal in real time differs from recordal in which a latent image is formed responsive to writing energy, in that the latter requires development for producing a real image while the former does not.

Contemporary effort in this highly developed art is directed to maximizing density of intelligence on records and minimizing cost of recordal. In the class of recording in which color change is produced in response to heat, character resolution is difficult to obtain and therefore intelligence density is sacrificed in the interest of clarity. In the class of recording which produces intelligence by providing patterns of clear spots, relatively high levels of energy are required. For example, in one heretofore known recording process, clear spots are formed in a recording medium comprised of a metal or a dye by volatalization through oxidization with focused laser output.

It is an object of the present invention to improve laser writing.

It is another object of the invention to produce real high density images in a recording medium with low levels of energy.

It is an additional object of the invention to provide an improved carrier for records, particularly records produced by laser writing.

It is a further object of the invention to improve recording media for producing real visual images.

SUMMARY OF THE INVENTION

To effect the foregoing, and other objects which will become apparent from the ensuing detailed description of the invention, a record is produced with a laser by focusing its output on a recording medium. The latter is opaque to sensing energy and has a pair of thermoplastic layers of a precursor and a reagent for chemically reacting with the precursor. Exposure of the recording medium continues for a period sufficient for provoking therein a chemical reaction and converting the medium to a state of permeability to sensing energy.

According to another aspect of the invention, each the precursor and the reagent is distributed in a corresponding layer. The precursor is a material convertible to a state of permeability to the sensing energy and separated from the reagent by a barrier layer.

From yet another aspect of the invention, the foregoing objects are achieved in a process for making a carrier for records in which a wet layer of a film forming material containing a precursor opaque to record sensing energy is applied to a substrate; the wet layer is then dried to form a first dry film on the substrate; a second wet layer of a film forming material containing a reagent reactable with the precursor to produce a material permeable to sensing energy is applied over the precursor; and the second wet layer is then dried to a second dry film over the first dry film.

DETAILED DESCRIPTION OF THE INVENTION

Figure 1:
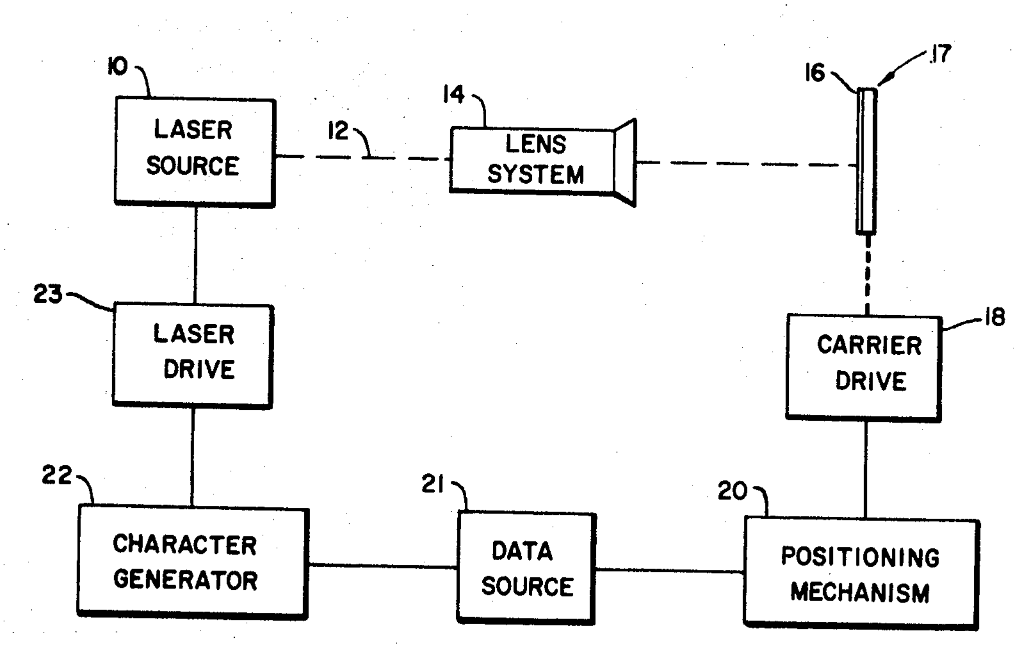
FIG. 1 is a scheme for laser writing according to the present invention.

Having reference now to FIG. 1, shown is a laser source 10, the output of which provides a preferably monochromatic laser beam along an optical axis 12. The laser source may be a gas laser or a solid state laser, such as a ruby rod, that is energized by a flash tube, as is well known in the art. The laser beam is directed through a coaxially aligned optical lens system 14 to be focused on the recording medium 16 of a carrier 17 for records. The carrier is supported, in a fashion which may be conventional, for movement in a path perpendicular to the optical axis and is mechanically coupled to a carrier drive 18 adapted for moving the carrier along said path, whereby relative movement may be effected between the carrier and the laser beam.

Carrier drive 18 may include a drive motor (not shown) which is controlled by a positioning mechanism 20 that energizes the motor selectively in response to signals transmitted by means which may be conventional from a data source 21 for stepping the carrier upon availability of intelligence for recordal. Typifying a data source is a data channel or a memory, for example, an automated program which may be a prerecorded tape (not shown).

The circuitry of a character generator 22, which may be of known construction, is responsive to availability of intelligence in the data source 21 for producing an encoded pulse stream representative of intelligence to be recorded. The thus formed pulses are imposed on a pulser or laser driver 23 for energizing the flash tube of laser source 10 and producing an encoded or modulated laser output corresponding to stimulating intelligence is serially generated synchronously with the movement of carrier 17.

In accordance with one aspect of the present invention, carrier 17 comprises a substrate 24 and a recording medium 16 which may be colored and which is carried on the substrate. In the preferred embodiment, the substrate is permeable to the energy which will be used for reading or sensing the record formed in the recording medium. If the substrate is light transparent, it may be fabricated from glass, regenerated cellulose, fused silica, and various plastics including copolymers of acrylic materials, polystyrenes, polyvinyl chloride, polyesters, such as polyethylene terphthalate, available as Mylar (E.I. duPont Co.), and polyimides. The thickness of the substrate should be sufficient to insure dimensional stability to the finished carrier. Suitable carriers in the instant process has been fashioned of a glass substrate having a thickness of 0.0625 inch and of Mylar film having a thickness of 0.0015 inch. The thermoconductivity of the substrate is a factor which should be considered, as the energy required for writing is proportional to the conductivity.

Recording medium 16 which covers one surface 26 of substrate 24 is laser responsive. That is to say, it changes its state by becoming permeable in response to the energy output of laser source 10.

In accordance with the present invention the recording medium comprises a precursor which is opaque to energy which will be used for record reading or sensing. It becomes converted to a permeable state to such energy following a chemical reaction in response to heat. Particularly, if a visible light is to be used for reading, the precursor is opaque thereto and becomes transparent upon exposure to the output of laser source 10.

Preferably, the precursor is a material having a color which is complementary to the output of laser 10. Thereby, energy absorption and consequently response of the precursor is maximized. Moreover, the preferred precursor is a reduceable material having a reduced form or yielding a conversion substance which is transparent to the sensing or reading energy. However, the precursor generally should not readily be reduceable upon application of heat in the absence of an activating reagent, such as a reducing agent for producing the desired conversion.

The preferred precursor for red laser output is methylene blue dye, this has a light transparent or leuco reduced form. Aurin (a well known yellow dye) may be used effectively with the blue laser output produced by a known argon laser. The light absorption of aurin is maximum at 5,346 and 4,795 A. Other materials such as rose aniline and paranose analine, and whose selection if made to complement the color of the laser beam, are also effective as precursors.

In the preferred embodiment of the invention the precursor is uniformally dispersed in a first dry film, coat or layer 28 on substrate surface 26. The binder, film former or forming material itself is inert and permeable to energy which will be used for sensing or reading the record when formed.

In producing dry film 28, a film former such as gelatin, locust bean gum, a starch, or a thermoplastic substance, such as polyvinyl alcohol, polyvinyl pyrrolidone, or polyvinyl acetate, is dissolved in a solvent, such as water, in which the precursor also preferably is dissolved to insure uniform precursor density. This solution is applied as a first wet cover on surface 26.

The thusly applied wet layer thereafter is dried, for example, by evaporation, to provide film 28. The resulting dry film comprises a dry solution of the precursor which is tenaciously adherent to surface 26. Water soluble polyvinyl materials are preferred as film formers because they enable maximizing the density of the precursors which have been used in this process. That is to say, the water soluble polyvinyl materials are more readily tolerated by other materials in solution. However the concentration of the precursor, as well as the concentration of the activating reagent, to be defined in ensuing description, are limited by their solubabilities in the dry film state to provide clarity. A suitable wet film solution for producing dry film 28 comprises:

| Ingredient | Percent by weight |
|---|---|
| Polyvinyl alcohol | 4 – 8 |
| Methylene blue dye | 1 – 2 |
| Water | 90 – 95 |

This solution is applied such that upon drying film 28 is $8 \times 10^{-5}$ inch thick.

Included in the recording medium is an activating reagent or a material which produces an activating agent. It is adapted for converting the precursor from a state of opacity to the sensing or reading energy to a state of permeability to such energy. Particularly, if the sensing energy is visible light, the state of the precursor is changed in response to the activating reagent from opacity to transparency. Reducing agents for the precursors comprise the preferred class of activating reagents. At least one of these is distributed, preferably in solution, in the recording medium preferably in latent form, the latter, upon application of heat, releasing a reducing agent. The precursor should not be reduceable readily upon application of heat in the absence of an activating reagent for producing the desired conversion.

Preferred as a source for a suitable reducing agent for methylene blue dye is 1-allyl-2-thiourea. This material is a latent reducing agent, which in the presence of heat becomes an active reducing agent, upon reaction with which the methylene blue dye is converted to its leuco form. Complexes of di-iso-cyanates, hydrosulfites and bisulfites also may be used as a latent reducing agent. These in the present of heat liberate $SO_2$ as a reducing agent.

The activating reagent is also dispersed uniformly and over the precursor. Particularly, in one form of the invention (FIG. 2) its latent form is distributed uniformly in a second dry film 30 which extends along surface 32 on the first dry film 28 in consequence of which the first dry film is sandwiched between substrates 24 and the second dry film.

To form the second dry film 30, a film former or binder is dissolved in the vehicle, such as water. The film former may be the same substance as the film former of the first dry film 28. The latent activating reagent also is dissolved in the vehicle; and the resulting solution is applied as a second wet cover to surface 32 of the first dry film 28, which is then exposed.

Thereafter, the second wet cover is dried, for example, by evaporation, to provide the second dry film 30 which comprises a dry solution of latent activating agent. A suitable wet cover solution for producing dry film 30 comprises:

| Ingredient | Percent by weight |
|---|---|
| 1-allyl-2-thiourea | 2 – 3 |
| Polyvinyl alcohol | 4 – 8 |
| Water | 89 – 94 |

This solution is applied such that upon drying film 30 is $8 \times 10^{-5}$ inch thick.

Some mixing may occur between the materials of film 28 and 30 before film 30 becomes dried. This undesirable effect can be minimized by exercising great care during application of the wet cover which produces film 30, or by judicious selection of components. However, if the latter course is selected, the disparity between the materials must be such that relative movement between the precursor and the activating reagent across surface 26 is not prevented when writing, as such crossing phenomenon is requisite for writing in accordance with the present invention.

Some conditions for writing will compel selection of a latent reducing agent which will disassociate and react spontaneously with the precursor under ambient conditions, even though exceedingly slowly. To preclude episodes of that character, and also to minimize risk in the use of identical film forming materials in films 28 and 30, an inert dry barrier, layer or film 34 (FIG. 3) of about $5 \times 10^{-5}$ inch in interposed or sandwiched between films 28 and 30. In consequence, it becomes inconsequential that the latent reducing agent disassociates readily; and a wider range and higher concentrations of activating reagents, including, for example, organoboron complexes, sodium benzene sulfinate, 5-salicyl sulfinic acid and ascorbic acid, as well as other sulfinates and sulfinic acids will be suitable, when the recording medium corresponds to FIG. 3 rather than to FIG. 2.

Barrier 34 is permeable to the sensing or reading energy; and preferably is a polymerized thermoplastic which is soluble in a solvent in which the film formers of dry films 28 and 30 are insoluble. Thereby, undesired mixing of the materials in films 28 and 30 is prevented.

Film formers for the barrier layer 34 may be selected from thermoplastic substances such as polyvinyl chloride, polyvinyl acrylics, or polystyrenes. These are readily soluble in conventional organic solvents such as alcohols or ketones in which the preferred film formers of layers 28 and 30 are insoluble. An effective barrier 34 is formed from an ethanol solution of 1 – 2 percent by weight of a polymer of hydroxypropyl cellulose, commercially available under the brand Klucel, as a product of Hercules, Inc.

The barrier 34 is formed by applying a wet cover of a solution of its film former, prior to the application of the second dry film 30, and after formation of dry film 28, surface 32 of first dry film 28. Following application of the last-named wet layer, it is dried, for example, by evaporation to form a film which is strongly adherent to the first dry film 28. Thereafter, second dry film 30 is applied to the then exposed surface 35 of barrier 34 to complete formation of the modified carrier (FIG. 3).

Figure 3:
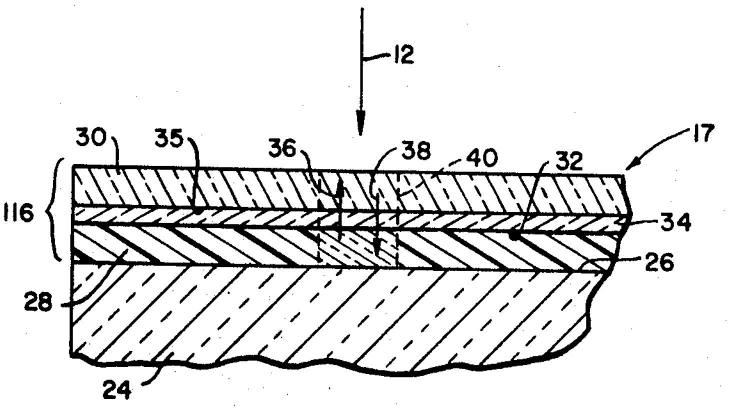
FIG. 3 is a section of another form of carrier for records according to the invention, the stippling illustrating opacity.

In this description, normal room conditions are considered ambient; and a carrier if constructed according to FIG. 3, has an exceedingly long storage life in an ambient environment. A writing reaction can be effected at a temperature which does not exceed 300° C, and heat is localized by focusing laser output on successive portions of the recording medium.

The reducing agent, if not in an active form, disassociates from its latent form in response to the heating produced by exposure to the laser output; and either one or both of the solutes in films 28 and 30 breaches barrier 34 passing into the layer of the other, as shown by arrows 36 and 38 to produce a permeable spot in the carrier during each successive exposure and along a narrow path 40 about optical axis 12 with an energy input of not more than 5 micro joules.

Such energy will generate a permeable spot 0.25 mils in height and 0.50 mils in width in the recording medium 16. Thereby, with a light of 6,328 A. as output of a 3 milliwatt helium/neon laser 10 about 240,000 discrete permeable spots can be generated per second. Thus, the recording medium is capable of permitting recordal of more than 2,400 encoded bits of an eight level code, or 240 words in coded form per second.

The resulting record can be read or sensed by passing a light, if the state of permeability is transparency, through the carrier for photometric detection.

Figure 2:
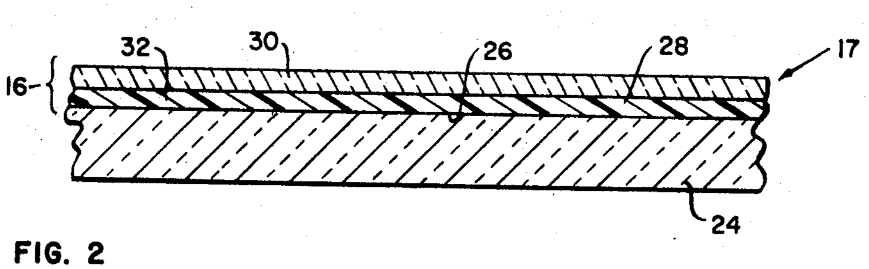
FIG. 2 is a section of one form of carrier for records according to the invention, the stippling illustrating opacity.

An effective carrier of the type shown in FIG. 2 has been produced in accordance with the following:

EXAMPLE 1

1.4 grams of methylene blue (J. T. Baker Co.) were dissolved in 100 grams of an aqueous solution consisting of 4.0 grams of high molecular weight polyvinyl alcohol, commercially available as Vinol 165 (Airco Co.) and 4.0 grams of low molecular polyvinyl alcohol, commercially available as U 229 (J. T. Baker Co.) in 92 grams of water, as a solvent. The resulting solution was applied with a Baker film applicator (Gardner Laboratory, Inc.) as a first wet coating of 0.002 inch to one surface of a 0.0015 inch Mylar film as substrate. Air drying of the wet coating for about one hour produced a first dried solution layer on the Mylar substrate of about 0.0002 inch in thickness.

Thereafter, a second wet coating of about 0.002 inch was applied with a Baker film applicator to the exposed surface of the dried layer. The second wet coating comprised a solution of 2.4 grams of 1-allyl-2-thiourea dissolved in 100 grams of a solution consisting of 4 grams of Vinol 165 and 4 grams of U 229 in 92 grams of water, as a solvent. Air drying of the second wet coating for about 1 hour produced a second dried solution layer of about 0.0002 inch in thickness between which, and the substrate, the first dried solution layer was sandwiched.

The resulting recording medium in laminar form developed discrete bleached dots in response to focused output from a laser source.

Effective carriers of the type shown in FIG. 3 have been produced in accordance with the following:

EXAMPLE II 1.4 grams of methylene blue were dissolved in 100 grams of an aqueous solution consisting of 4.0 grams of Vinol 165 and 4.0 grams of U 229 in 92 grams of water, as solvent. The resulting solution was applied with a Baker film applicator as a first wet coating of 0.002 inch to one surface of a 0.0015 inch Mylar film as substrate. Air drying of the wet coating for about 1 hour produced a first dried solution layer on the Mylar substrate of about 0.0002 inch in thickness.

Thereafter, a second wet coating of about 0.002 inch was applied with a Baker film applicator to the exposed surface of the first dried solution layer. The second wet coating comprised 1 gram of hydroxypropyl cellulose available commercially as Klucel (Hercules Inc.), in a solvent of 99 grams of isopropyl alcohol. Air drying of the second wet coating for about 1 hour produced a dried polymer film as a barrier layer of about < 0.00005 inch in thickness tightly bonded to the first dried layer and in which the methylene blue is insoluble.

A third wet coating of about 0.002 inch was applied with a Baker film applicator to the exposed surface of the second dried layer. The third wet coating comprised a solution of 2.4 grams of 1-allyl-2-thiourea dissolved in 100 grams of a solution consisting of 4 grams of Vinol 165, and 4 grams of U 229 dissolved in 92 grams of water. Air drying of the third wet coating for about 1 hour produced a third dry solution layer of about 0.0002 inch in thickness between which and the first dried layer the barrier layer was sandwiched.

The resulting recording medium in laminar form is responsive to focused output of a laser source for producing discrete encoding generated bleached dots.

A record generated on a carrier produced according to the foregoing examples may be sensed or read with attenuated light from laser source 10.

Inasmuch as modifications in the described art, construction and process could be conceived, and as many changes could be made therein without departing from the spirit and scope of the claims, it is intended that all matter contained in the accompanying specification shall be considered as illustrative only and not in a limiting sense.

I claim:

1. A carrier for records having a recording medium adapted for an intelligence pattern capable of being read and of being produced in real time with the output of a laser, and characterized in that said recording medium comprises:

a precursor layer being a dried solution of a binder material and a solvent and having methylene blue dye as a precursor dissolved therein, said precursor being opaque to energy to be used for sensing a record formed therein and convertible to a state permeable to said energy;

a second layer being a dried solution of a binder material and a solvent and having therein dissolved at least one substance selected from the class comprising a thiourea, and complexes of di-isocyanates, hydrosulfites and bisulfites as a reducing reagent for reaction to convert said precursor to its energy permeable state; and a barrier permeable to such energy, said barrier being a dried solution of a binder material and a solvent and disposed between said precursor layer and said second layer, the binder material of said precursor and second layers being insoluble in the solvent of said barrier layer for preventing spontaneous reaction between said precursor and said reagent.

2. A device according to claim 1 wherein the solvent of the binder of the precursor layer is water.

3. A device according to claim 1 wherein the solvents of said precursor and second layers are water and the solvent of said barrier is organic.

4. A device according to claim 3 wherein the binder material of said precursor and second layers is at least one substance selected from the class comprised of gelatin, locust bean gum, starch, polyvinyl alcohol, polyvinyl pyrrolidone, and polyvinyl acetate.

5. A device according to claim 4 wherein the binder material of said barrier is at least one substance selected from the class comprising polyvinyl chloride, polyvinyl acrylic, and polystyrene.

* * * * *

PO-1050
(5/69)

UNITED STATES PATENT OFFICE
CERTIFICATE OF CORRECTION

Patent No. 3,740,761 Dated June 19, 1973

Inventor(s) Henry G. Fechter

It is certified that error appears in the above-identified patent and that said Letters Patent are hereby corrected as shown below:

In the Abstract:

line 1, after "of" insert --a--;

line 11, change "react" to --reacts--.

In the Specification:

Column 1, line 52, after "to" delete --another aspect of--.

Column 1, delete lines 64, up to and including line 3 of Column 2 and add as a paragraph, the following:

--The precursor is methylene blue, which is dissolved in a first layer including a dried solution of a binder and a solvent. The reagent is dissolved in a second layer, and comprises a thiourea, or a complex of di-isocyanates, hydrosulfites or bisulfites as a reducing agent. The barrier layer is disposed between the precursor layer and the second layer, and functions to prevent spontaneous reaction.--

Signed and sealed this 9th day of July 1974.

(SEAL)
Attest:

McCOY M. GIBSON, JR.
Attesting Officer

C. MARSHALL DANN
Commissioner of Patents